Oct. 16, 1951   R. BOETTINGER   2,571,665
TIRE CHAIN APPLIER
Filed March 25, 1948
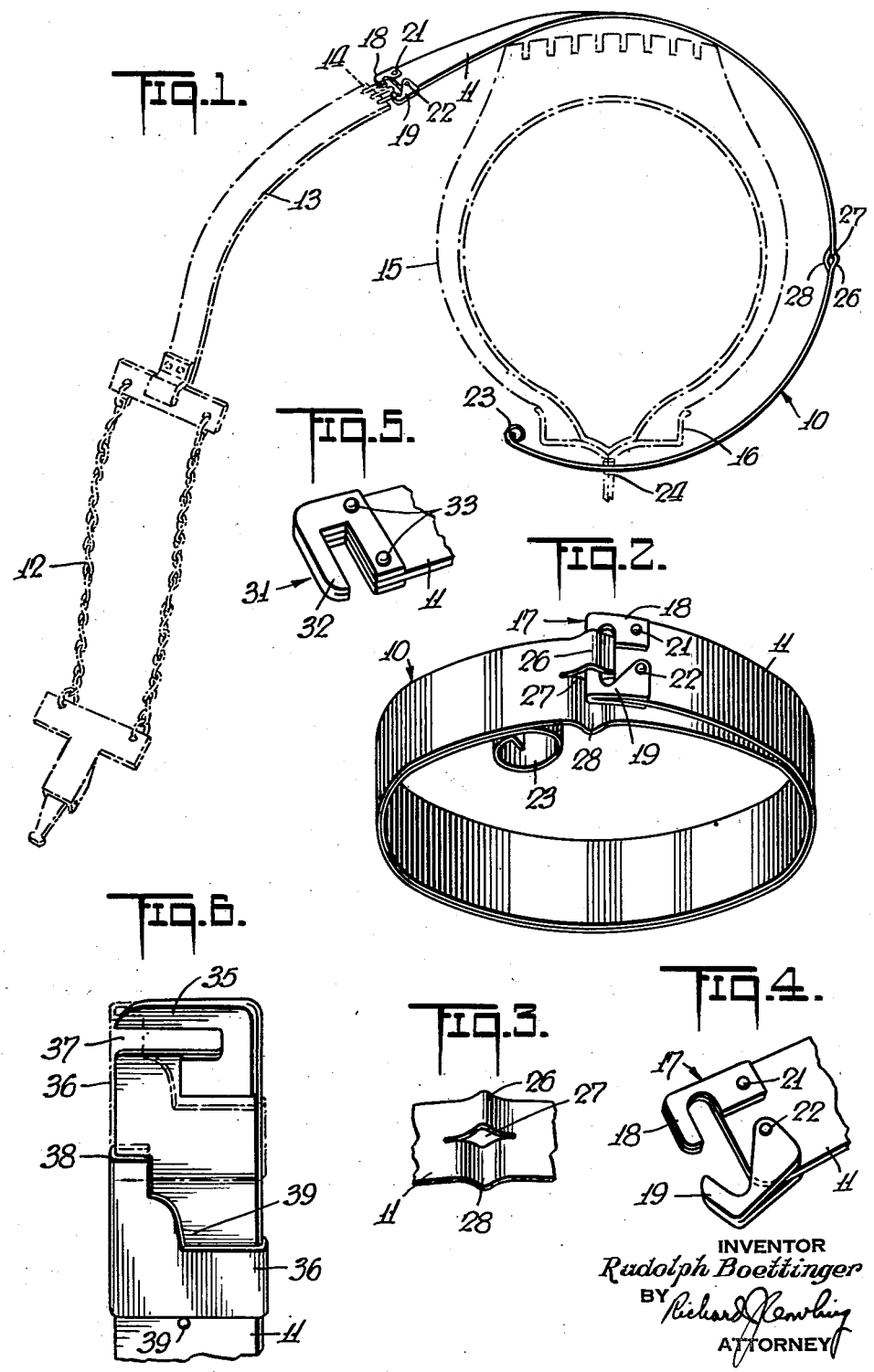
INVENTOR
Rudolph Boettinger
BY
ATTORNEY Patented Oct. 16, 1951

2,571,665

UNITED STATES PATENT OFFICE 2,571,665

TIRE CHAIN APPLIER

Rudolph Boettinger, Englewood, N. J.

Application March 25, 1948, Serial No. 16,913

2 Claims. (Cl. 81—15.8)

The present invention relates generally to an applier for tire chains, and it has particular relation to a tool or device for facilitating the attachment or mounting of emergency unit tire chains, mud-hooks, anti-skid devices and the like to the mounted tires of an automotive vehicle wheel.

An object of the invention is to provide a simple, durable and inexpensive tool or snake for facilitating the application of the unit type of emergency tire chain to automobile tires mounted on a vehicle wheel, which emergency unit chain consists of a tire encircling non-skid element or device that is applied individually at any given point or points spaced circumferentially of the mounted tire and wheel.

Another object of the invention is the provision of an applier that is provided with an integrally formed locking device to prevent the unit tire chain from becoming accidentally disengaged from the applier after being attached thereto and while it is being used.

A further object of the invention is the provision of an applier that may be conveniently rolled or coiled upon itself and secured in such coiled position without the aid of separate tying straps that may be easily mislaid or lost.

Another object of the invention is to provide a suitable and convenient coiling arrangement for the applier that will cause it to unroll into substantially the arcuate position in which it is to be used in applying a unit emergency tire chain to a mounted tire, thereby facilitating its encirclement about the tire and wheel.

Other and further objects and advantages of the invention reside in the detailed construction of the applier or tool, which result in simplicity, economy and efficiency, and which will be apparent from the following description, wherein preferred forms of embodiment of the invention are shown, reference being had to the accompanying drawings, forming a part hereof, wherein like numerals indicate like parts, in which:

Figure 1 is a fragmentary view, showing an automobile tire and wheel in cross-section in dotted lines, and illustrating perspectively the manner in which the applier is used in applying a unit or emergency tire chain thereto, the latter being also shown in dotted lines;

Figure 2 is an enlarged perspective view of the tire chain applier shown in Figure 1, the same illustrating the manner in which it may be rolled or coiled upon itself for storage when not in use;

Figure 3 is a fragmentary perspective view showing the construction of the strap loop for locking the coiled applier shown in Figure 2;

Figure 4 is a fragmentary and slightly enlarged perspective view of the locking device of the applier shown in Figure 2, the same having one of its pivotal jaws swung partially outwardly to illustrate its open position;

Figure 5 is a fragmentary perspective view of a modified form of engaging device which can be employed for securing the same to the outwardly projecting end loops of a conventional unit or emergency tire chain; and Figure 6 is a fragmentary front elevational view of another form of locking device which can be used advantageously with my applier for engaging and securing the projecting end loops of a unit or emergency tire chain.

Referring now to the drawings, and particularly to Figures 1 to 4 thereof, there is shown an applier 10 consisting of a relatively long section of a conventional flexible metal tape 11 of a substantial width as compared to its thickness dimensions, such as ordinary box strapping. Box strapping is a relatively cheap, stiff and highly flexible metal tape that is readily coilable, but yet has none of the characteristics of the more expensive and highly tempered spring metals. Box strapping can be purchased on the open market in a variety of sizes and thicknesses. A very excellent applier for mounting emergency or unit tire chains to substantially all sizes of passenger automobile tires can be formed from a section of such tape that is approximately two feet in length, three-quarters of an inch wide and one thirty-second of an inch thick. These dimensions are not critical, and are not to be considered as limiting, but are given only for exemplary purposes to illustrate a convenient size for a desirable passenger car tire applier.

An exemplary form of an emergency or unit tire chain 12, of which there are many on the open market, is shown in dotted lines in Figure 1, and it will be noted that its fastening strap 13 is provided with a series of transversely spaced end metal loops 14 for attachment to the applier 10 when the same is adapted to be used in mounting an emergency tire chain unit over the mounted tire of a conventional automobile wheel.

The outer end of the tape 11, when the same is coiled upon itself, is provided with a securing member 17, which consists of a pair of opposed metal hook members 18 and 19 mounted on opposite sides thereof. Either or both of the hook members 18 and 19 may be mounted pivotally on the tape 11 by means of their respective pins or rivets 21 and 22.

The inner end of the tape 11 is coiled permanently into a small spiral or circular knob 23, which serves as a stop member to prevent the tape 11 from being inadvertently drawn through the conventional attaching slot 24 in the wheel rim 16 during the operation of applying a tire chain unit thereto.

Intermediate the ends of the tape 11 and approximately along its median transverse axis, there is provided a loop 26, which is adapted to serve as a fastening member in cooperation with one or both of the securing members 18 and 19 for releasably locking said members together to maintain the applier 10 in a coiled or nested position when not in use, as best shown in Figure 2. The cooperating member 26 may be formed in various ways, as, for example, by welding or otherwise permanently securing a ring, loop or lug to the surface of the tape 11. However, an excellent and exceeding simple form is shown in Figure 3, wherein the loop 26 is formed integrally in the tape 11 by merely cutting it for a short distance longitudinally, as indicated at 27, intermediate its ends, and bending the adjacent side sections vertically in opposite directions, i. e., one upwardly and the other downwardly, thereby providing a simple loop and riding ridges on opposite sides of the tape 11.

Referring now to Figure 5, there is shown a modified form of securing member 31, which consists merely of a single hook member 32 mounted fixedly by spot-welding or other suitable means, such as by rivets 33, to the outer end of the tape 11. This modification has no cooperating securing member to prevent the hook member 32 from accidentally disengaging the end loops 14 of the tire chain strap 13 or the cooperating loop 26 of the securing member formed integrally in the tape 11.

Another modification is shown in Figure 6, wherein the outer end of the tape 11 is provided with a single fixed hook 35 and a longitudinally sliding cooperating sleeve member 36, having one side adapted to project forwardly to cover the hook opening 37, as indicated at 38. The forwardly projecting side 38 provides a cooperating securing member with the hook 35 to prevent accidental disengagement of the applier 10 from the emergency tire chain strap 13. A stop 39, which can be conveniently formed by merely indenting one side of the tape 11 with a center punch to provide a corresponding projection on the opposite side thereof, is provided a short distance back from the end thereof to limit the longitudinal movement of said cooperating sleeve member 36 inwardly of said tape 11. The sleeve member 36 is shown in dotted lines in its normal securing position, and its frictional contact with the tape 11 prevents it from slipping readily out of any one position. The recessed portion 39 of the sleeve member 36, which is on the side opposite the securing projection 38, permits the sleeve to be used to fasten the hook 35 on the cooperating loop 26 of the securing member when the applier 10 is coiled for storage, as best shown in Figure 2.

One advantage of being able to readily store the present applier 10 in a small coiled position, as best shown in Figure 2, is that, when the same is unhooked or released, the relatively non-springy untempered strapping metal tape 11 has just enough inherent resiliency to tend to open up arcuately to a diameter sufficient to closely encircle the mounted tire 15 of a conventional automobile wheel 16. In other words, it has an inherent resiliency which is facilitated by its coiled storage position that tends to cause it to open up into a generally desirable shape for immediate use.

Although I have described in detail several modifications which the invention may assume, it will be readily apparent to those skilled in the art that the same is not so limited, but that various other modifications may be made therein without departing from the spirit thereof.

What I claim is:

1. An applier for mounting emergency tire chain units to the mounted tire of an automobile wheel consisting of a relatively long coilable section of a flexible metal tape having a securing member adjacent its outer end for engaging a tire strap, said securing member including a pair of jaws mounted at spaced points, one of which is pivotal, for securing the same removably to the strap of an emergency tire chain, a stop member adjacent its inner end to prevent the tape from being withdrawn through said wheel, and a fastening member extending outwardly of its outer surface intermediate its ends adapted to receive said securing member for releasably locking the tape in its normally coiled position when not in use.

2. An applier for mounting emergency tire chain units to the mounted tire of an automobile wheel consisting of a relatively long coilable section of a flexible metal tape having a substantial width as compared to its thickness dimensions, a securing member mounted adjacent the outer end of said tape, said securing member consisting of a pair of opposing pivotal hooks adapted to releasably engage the tire chain strap, and a fastening member extending outwardly of its outer surface adapted to receive said securing member for releasably locking the tape in its normally coiled position when not in use.

RUDOLPH BOETTINGER.

REFERENCES CITED

The following references are of record in the file of this patent:

UNITED STATES PATENTS

| Number | Name | Date |
| --- | --- | --- |
| 197,602 | Clark | Nov. 27, 1877 |
| 204,588 | Loyd | June 4, 1878 |
| 1,534,879 | Stewart | Apr. 21, 1925 |
| 2,131,405 | Martz | Sept. 27, 1938 |
| 2,328,680 | Royer | Sept. 7, 1943 |